US006371855B1

(12) United States Patent
Gavriloff

(10) Patent No.: US 6,371,855 B1
(45) Date of Patent: Apr. 16, 2002

(54) FANTASY INTERNET SPORTS GAME

(75) Inventor: Ivan Gavriloff, Paris (FR)

(73) Assignee: Winamax.com Limited, London (GB)

( * ) Notice: Subject to any disclaimer, the term of this patent is extended or adjusted under 35 U.S.C. 154(b) by 20 days.

(21) Appl. No.: 09/657,611

(22) Filed: Sep. 8, 2000

(51) Int. Cl.[7] ................................................ A63F 13/00
(52) U.S. Cl. .................... 463/42; 463/1; 463/9
(58) Field of Search ............................ 463/1–5, 40–42; 700/91–93

(56) References Cited

U.S. PATENT DOCUMENTS

| | | | |
|---|---|---|---|
| 4,918,603 A | 4/1990 | Hughes et al. | 364/410 |
| 5,018,736 A | 5/1991 | Pearson et al. | 273/439 |
| 5,263,723 A | 11/1993 | Pearson et al. | 273/439 |
| 5,713,793 A | 2/1998 | Holte | 463/25 |
| 5,830,069 A | * 11/1998 | Soltesz et al. | 463/42 |
| 5,846,132 A | 12/1998 | Junkin | 463/42 |
| 5,860,862 A | 1/1999 | Junkin | 463/40 |
| 5,971,854 A | 10/1999 | Pearson et al. | 463/41 |
| 6,007,426 A | 12/1999 | Kelly et al. | 463/16 |
| 6,135,881 A | * 10/2000 | Abbott et al. | 463/3 |

OTHER PUBLICATIONS

Nothing But Net: Fantasy Games at Small World Sports, Stadium & Arena Financing News, vol. 2 No. 24 p. 8, Dec. 14, 19998.*
Small World Brings New Fantasy Sports Games to Lycos Users, Business Wire, p. 1502, Oct. 25, 1999.*
Alta Vista Kicks Off Fantasy Football—Internet Users Draft, Manage Pro Players With $50M Salary Cap, Business Wire, Aug. 31, 1999.*
On The Net; Fantasy trading Games eases Wall Street Burden, tommy Cummings, Star–Telegram Writer, Jan. 5, 2000.*
Small World, the Invisible Powerhouse in Online Fantasy Sports, About to flex its football muscle, PR Newswire, Aug. 31, 1999.*
SPORTSDAQ Market Lanuches College Basketball tournament Prediction Games, Business Wire, p. 0360, Feb. 24, 2000.*

* cited by examiner

Primary Examiner—Jessica J. Harrison
Assistant Examiner—John M Hotaling
(74) Attorney, Agent, or Firm—Fitzpatrick, Cella, Harper & Scinto

(57) ABSTRACT

A system for providing an interactive sports game to a plurality of participants wherein each participant wishes to form a fantasy sports team made up of actual players. The system is operable: (a) to solicit and accept from each participant an initial selection and purchase of players to form the participant's fantasy sports team, each participant purchasing the players using no more than a predetermined number of game value units initially allocated by a host controller; and (b) responsive to a request of a participant, to access the data storage and report a status of the participant's fantasy team, the status including information as to the performance and market value of the players on the participant's team. The number of game value units associated with each player varies in correlation with the demand of the participants for that player and a participant receives periodically a value-based reward correlated to the value and/or performance of the players on a participant's team.

20 Claims, 16 Drawing Sheets

FIG. 2

Game Web Site

Navigation: Home | The Game | Sign up | My Account | Table | Rules | The Season | Players | Clubs | Results | Schedule To become the MANAGER of a football team, you just have to pick players among the best european squads.
Each month, GREAT PRIZES reward the best managers.
At the end of the season, the winners share a super cash prize which amount is equal to one euro per registered manager.

On Game Web Site, the more managers there are, the more MONEY there is to win.
TELL IT to your friends!

FREE Sign Up   How to Play   How to Win

Soccer news

Players   Clubs   Results

*Also...*
highest wages
highest transfers
links
transfers 2000

Game Web Site fantasy

Best managers (12/04/2000)

| Value ranking | | Points ranking | |
|---|---|---|---|
| 1. Tenley1 | 7366 Wam | 1. FC Comblain-laTour | 70 Pts |
| 2. MU US | 7282 Wam | 2. ManU Poofters | 69 Pts |
| 3. GB2 GLADO | 7254 Wam | 3. Riflette | 67 Pts |
| 4. OM@10 | 7215 Wam | 4. l'hiver poule | 66 Pts |
| 5. anthony | 7209 Wam | 5. Liverpool Rangers | 65 Pts |
| next... | | next... | |

Today, 43228 managers.

Best players (12/04/2000)

| Value ranking | | Point ranking | | March 2000 points | |
|---|---|---|---|---|---|
| 1. BECKHAM | 938 Wam | 1. BECKHAM | 405 Pts | 1. SCHOLES | 97 Pts |
| 2. HENRY | 836 Wam | 2. YORKE | 382 Pts | 2. OWEN | 94 Pts |
| 3. COLE | 670 Wam | 3. COLE | 381 Pts | 3. THOMPSON | 88 Pts |
| 4. DESAILLY | 651 Wam | 4. SCHOLES | 370 Pts | 4. KILBANE | 82 Pts |
| 5. YORKE | 636 Wam | 5. BOSNICH | 354 Pts | 5. QUINN | 82 Pts |
| next... | | next... | | next... | |

On Game Web Site, the more managers there are, the more MONEY there is to win.
TELL IT to your friends!

FIG. 4

Form your national team:

Club : jazzmen
you have capital of : 3200 Wam to buy your players, you can spend : 2900 Wam

To have further information, click here how to play?

Automatic selection of your squad :   [Click here!]

Manual selection of your squad :   200

Goal Keeper
click here to select your goal keeper

Change team tactic:  [4-3-3 ⇕] [OK]   202

Defences
click here to select your defences   204

Midfields
click here to select your midfields   206

Strikers
click here to select your forwards

208

Team Value          0 Wam

Select a Goalkeeper

| Name | Club | Value | Best | Worst | Points | Demand | Action |
|---|---|---|---|---|---|---|---|
| ARPHEXAD | Leicester | 143 | 175 | 137 | 109 | 63 | <select> |
| BAARDSEN | Tottenham | 211 | 229 | 202 | 87 | 88 | <select> |
| BERESFORD | Middlesbro | 103 | 154 | 103 | 130 | 16 | <select> |
| BEVAN | Southampton | 71 | 91 | 63 | 143 | 44 | <select> |
| BOSNICH | Mu | 534 | 536 | 239 | 321 | 457 | <select> |
| BROWN | Tottenham | 106 | 153 | 106 | 87 | 21 | <select> |
| BYWATER | West Ham | 70 | 99 | 68 | 122 | 33 | <select> |
| CHAMBERLAIN | Watford | 78 | 133 | 78 | 27 | 5 | <select> |
| CLARKE | Bradford | 99 | 153 | 99 | 31 | 7 | <select> |
| CUDICINI | Chelsea | 181 | 203 | 178 | 240 | 76 | <select> |

< A-B-C-D-E-F-G-H-I-J-K-L-M-N-O-P-Q-R-S-T-U-V-W-X-Y-Z >          < Next >

210          Submit

Select a Goalkeeper          [          ] [ok]

Home|Sign up|My Account|Table|Players|Clubs|Results|Rules|Schedule

Sidebar: Home | The Game | Sign up | My Account | Table | Rules | The Season | Players | Clubs | Results | Schedule

FIG. 5

Game Web Site

Form your national team:

Club : jazzmen
you have capital of : 3200 Wam to buy your players, you can spend : 2900 Wam

To have further information, click here how to play?

| Automatic selection of your squad : | Click here! |

Manual selection of your squad :

Goal Keeper
GIVEN S. (291Wam)     modify this selection

Defences
RUDDOCK N. (182Wam)     modify this selection
TRAMEZZANI P. (121 Wam)     modify this selection
TARICCO M. (118Wam)     modify this selection
ADAMS T. (513Wam)     modify this selection Midfields
MAYBURY A. (197Wam)     modify this selection
KACHLOUL H. (188Wam)     modify this selection
KEANE R. (600Wam)     modify this selection Strikers
SIBON G. (114Wam)     modify this selection
HESKEY E. (305Wam)     modify this selection
KANOUTE F. (122Wam)     modify this selection

Change team tactic:
4-3-3 OK

Team Value     2751 Wam

Select a Goalkeeper

| Name | Club | Value | Best | Worst | Points | Demand | Action |
|---|---|---|---|---|---|---|---|
| ARPHEXAD | Leicester | 143 | 175 | 137 | 109 | 63 | <select> |
| BAARDSEN | Tottenham | 211 | 229 | 202 | 87 | 88 | <select> |
| BERESFORD | Middlesbro | 103 | 154 | 103 | 130 | 16 | <select> |
| BEVAN | Southampton | 71 | 91 | 63 | 143 | 44 | <select> |
| BOSNICH | Mu | 534 | 536 | 239 | 321 | 457 | <select> |
| BROWN | Tottenham | 106 | 153 | 106 | 87 | 21 | <select> |
| BYWATER | West Ham | 70 | 99 | 68 | 122 | 33 | <select> |
| CHAMBERLAIN | Watford | 78 | 133 | 78 | 27 | 5 | <select> |
| CLARKE | Bradford | 99 | 153 | 99 | 31 | 7 | <select> |
| CUDICINI | Chelsea | 181 | 203 | 178 | 240 | 76 | <select> |

< A-B-C-D-E-F-G-H-I-J-K-L-M-N-O-P-Q-R-S-T-U-V-W-X-Y-Z >     < Next >

Submit

Select a Goalkeeper     ok

Home|Sign up|My Account|Table|Players|Clubs|Results|Rules|Schedule

Sidebar: Home | The Game | Sign up | My Account | Table | Rules | The Season | Players | Clubs | Results | Schedule

FIG. 6

Open your personal account:
Club: jazzmen
Manager surname: [         ]
Password: [         ] — 302
Password (confirm): [         ]

Warning: the fields above are case sensitive.

🏴 nationale team    300    ...........

Team tactic: 4 - 3 - 3                                Team tactic: ...

| | | | | | |
|---|---|---|---|---|---|
| Goal | | | Goal | | |
| 1 | FORREST Craig. | 226 Wam | 1 | .... | .... Wam |
| Defender | | | Defender | | |
| 2 | WALKER Des. | 191 Wam | 2 | .... | .... Wam |
| 3 | HINCHCLIFFE Andy. | 185 Wam | 3 | .... | .... Wam |
| 4 | BREEN Gary. | 211 Wam | 4 | .... | .... Wam |
| 5 | NOLAN Ian. | 194 Wam | Midfielder | | |
| Midfielder | | | 5 | .... | .... Wam |
| 6 | LOMAS Steve. | 209 Wam | 6 | .... | .... Wam |
| 7 | GERRARD Steven. | 262 Wam | 7 | .... | .... Wam |
| 8 | LENNON Neil. | 214 Wam | 8 | .... | .... Wam |
| Striker | | | Striker | | |
| 9 | OWEN Michael. | 568 Wam | 9 | .... | .... Wam |
| 10 | LE TISSIER Matthew. | 179 Wam | 10 | .... | .... Wam |
| 11 | SOLSKJAER Ole Gunnar. | 371 Wam | 11 | .... | .... Wam |

Value:         Available                    Value:            Available:
2810 Wam    390 Wam                 0 Wam         3000 Wam

To modify your selection, click "Back" on your browser

Optional choices:
You can take out insurance in case one or more players in your team get injured and cannot play the next matches (see The Rules for more details)
Insurance premium: 281 Wam

Insurance: ○ Yes  ⊙ No

You can invest the available balance:

On the Eurostoxx 50       ○
At a fixed rate of 4%     ○
No investment             ⊙

You can take out insurance in case one or more players in your team get injured and cannot play the next matches (see The Rules for more details)
Insurance premium: 0 Wam

Insurance: ○ Yes  ⊙ No

You can invest the available balance:

On the Eurostoxx 50       ○
At a fixed rate of 4%     ○
No investment             ⊙

304
305

Submit

FIG. 8

Congratulations,
*you are now a manager*
on Game Web Site

*Thank you* for signing up johnny and welcome aboard!
You are now a member of Game Web Site, known as the exclusive manager of the team jazzmen.

To follow the *performance* of your squad, *transfer* player and change team *tactic*, check my account.
Your account allows you to control in real time the progress of your *players value (in Wam)*.
Every Monday evening, *the value* of your team is updated according to the actual performance of the players during the week. So is the position of your team in the Game Web Site ranking points.

It's now up to you, to become the new *top team* manager.
For further information, consult the Rules.

*Good luck* johnny!

Do not forget to add Game Web Site to your favourite sites.

On Game Web Site, the more managers there are, the more MONEY there is to win.
TELL IT to your friends!

Home|Sign up|My Account|Table|Players|Clubs|Results|Rules|Schedule

FIG. 10

Game Web Site

My account
Club: jazzmen
Manager: johnny smith
Date of formation: 11/04/00

Team(s): National

<rectify my personal information>

English Premiership Team

| Players 601 | Purchased value 602 | Current value 603 | Progress 604 | Points 605 | Date of Purchase 606 | 607 |
|---|---|---|---|---|---|---|
| G FORREST C. | 226 | 224 | -0.88% | 143 | 11/04/00 | transfer |
| D BREEN G. | 211 | 210 | -047% | 81 | 11/04/00 | transfer |
| D HINCHCLIFFE A. | 185 | 185 | --- | 126 | 11/04/00 | transfer |
| D NOLAN I. | 194 | 194 | --- | 95 | 11/04/00 | transfer |
| D WALKER D. | 191 | 191 | --- | 106 | 11/04/00 | transfer |
| M LENNON N. | 214 | 214 | --- | 85 | 11/04/00 | transfer |
| M LOMAS S. | 209 | 209 | --- | 153 | 11/04/00 | transfer |
| M GERRARD S. | 262 | 263 | +0.38% | 240 | 11/04/00 | transfer |
| S OWEN M. | 568 | 574 | +1.05% | 287 | 11/04/00 | transfer |
| S LE TISSIER M. | 179 | 179 | --- | 157 | 11/04/00 | transfer |
| S SOLSKJAER O. | 371 | 373 | +0.53% | 314 | 11/04/00 | transfer |

My Team 600

More about Transfers, click here

610 → My Value
Team Value: 2816 Wam    Purchased value: 3200 Wam
Placement: 393 Wam      Progress: -10.61 %
Total value: 3209 Wam 620 → Value ranking   You are in position 2707th on 2733 managers.

622 → Points ranking  You are in position 2364th on 2733 managers.
More about points, click here

Investment change    [Euro 50 ▼]

Home|Sign up|My Account|Table|Players|Clubs|Results|Rules|Schedule

FIG. 12

The Players

800 — Championship: [England ▾]  
801 — Position: [All ▾]  
802 — Sort by: [Alphabetical order ▾]  
804 — Display 805 — Players - international championship

| Name | Club | Position | Current Value | Highest Value | Lowest Value | Progression | Points | Demand |
|---|---|---|---|---|---|---|---|---|
| ABOU | West Ham | S | 208 | 232 | 196 | -5% | 106 | 149 |
| ADAMS | Arsenal | D | 515 | 516 | 251 | +102% | 141 | 680 |
| AINSWORTH | Wimbledon | M | 147 | 150 | 128 | +5% | 25 | 103 |
| ALEXANDER | West Ham | S | 111 | 132 | 61 | +48% | 106 | 174 |
| ALEXANDERSSON | SheffWed | M | 311 | 315 | 229 | +30% | 163 | 269 |
| ALEXSIDZE | Chelsea | S | 137 | 150 | 119 | -9% | 114 | 133 |
| ALOISI | Coventry | S | 186 | 230 | 186 | -15% | 84 | 96 |
| AMBROSETTI | Chelsea | S | 281 | 281 | 176 | +48% | 226 | 497 |
| ANDERSEN | Wimbledon | D | 171 | 175 | 149 | +7% | -2 | 116 |
| ANDERTON | tottenham | M | 371 | 371 | 228 | +55% | 115 | 268 |
| ANDRESEN | Wimbledon | M | 145 | 166 | 142 | -6% | 34 | 63 |
| ANGUS | West Ham | D | 162 | 163 | 73 | +91% | 72 | 196 |
| ARDLEY | Wimbledon | M | 142 | 152 | 130 | +1% | 54 | 70 |
| ARMSTRONG | Middlesbro | S | 112 | 150 | 110 | -20% | 107 | 41 |
| ARMSTRONG | Tottenham | S | 132 | 152 | 127 | -6% | 183 | 75 |
| ARPHEXAD | Leicester | G | 144 | 175 | 137 | -10% | 109 | 69 |
| ATHERTON | SheffWed | D | 147 | 151 | 129 | +5% | 106 | 88 |
| BAARDSEN | Tottenham | G | 211 | 229 | 202 | -2% | 87 | 91 |
| BABAYARO | Chelsea | D | 530 | 530 | 298 | +71% | 252 | 486 |
| BABB | Liverpool | D | 376 | 376 | 257 | +39% | 245 | 259 |

< A-B-C-D-E-F-G-H-I-J-K-L-M-N-O-P-Q-R-S-T-U-V-W-X-Y-Z >    < Next >

Searching a player    [          ] ok  — 814

Home|Sign up|My Account|Table|Players|Clubs|Results|Rules|Schedule

FIG. 13

*Game Web Site*

The Clubs
Championship
[England ▾] ← 900

Sort by — 901
[Alphabetical order ▾]

| | Clubs - international championship (902) | Average Value (903) | Total Value (904) |
|---|---|---|---|
| 1 | Arsenal | 342 | 8212 |
| 2 | Aston Villa | 186 | 4298 |
| 3 | Bradford City | 113 | 3075 |
| 4 | Chelsea | 310 | 9623 |
| 5 | Coventry City | 132 | 4241 |
| 6 | Derby County | 143 | 4168 |
| 7 | Everton | 158 | 4444 |
| 8 | Leeds United | 224 | 5397 |
| 9 | Leicester City | 142 | 3703 |
| 10 | Liverpool | 291 | 7870 |
| 11 | Manchester United | 392 | 11767 |
| 12 | Middlesbrough FC | 141 | 4116 |
| 13 | Newcastle United | 203 | 6514 |
| 14 | Sheffield Wednesday | 139 | 3904 |
| 15 | Southampton | 123 | 3936 |
| 16 | Sunderland | 145 | 4496 |
| 17 | Tottenham Hotspur | 162 | 5695 |
| 18 | Watford | 112 | 3928 |
| 19 | West Ham United | 151 | 5149 |
| 20 | Wimbledon | 135 | 4210 |

Sidebar: Home | The Game | Sign up | My Account | Table | Rules | The Season | Players | Clubs | Results | Schedule Home|Sign up|My Account|Table|Players|Clubs|Results|Rules|Schedule

FIG. 14B

| | Top scorers 1005 | | | | |
|---|---|---|---|---|---|
| | Players | Team | Goals | Value | Demand |
| 1. | Kevin PHILLIPS | Sunderland | 27 | 483 | 520 |
| 2. | Andy COLE | Manchester United | 19 | 670 | 750 |
| 3. | Alan SHEARER | Newcastle United | 19 | 385 | 284 |
| 4. | Dwight YORKE | Manchester United | 17 | 636 | 688 |
| 5. | Michael BRIDGES | Leeds United | 15 | 357 | 319 |
| 6. | Niall QUINN | Sunderland | 13 | 208 | 65 |
| 7. | Paolo DI CANIO | West Ham United | 13 | 159 | 93 |
| 8. | Steffan IVERSON | Tottenham Hotspur | 13 | 124 | 39 |
| 9. | Thierry HENRY | Arsenal | 12 | 836 | 1586 |
| 10. | Kevin CAMPBELL | Everton | 12 | 107 | 40 |
| 11. | Michael OWEN | Liverpool | 11 | 574 | 582 |
| 12. | Robbie KEANE | Coventry City | 11 | 250 | 90 |
| 13. | Hamilton RICARD | Middlesbrough FC | 11 | 191 | 65 |
| 14. | Chris ARMSTONG | Tottenham Hotspur | 11 | 132 | 75 |
| 15. | Nwankwo KANU | Arsenal | 10 | 383 | 349 |
| 16. | Marian PAHARS | Southampton | 10 | 184 | 48 |
| 17. | Tore Andrea FLO | Chelsea | 9 | 473 | 545 |
| 18. | Harry KEWELL | Leeds United | 9 | 421 | 448 |
| 19. | Paul SCHOLES | Manchester United | 9 | 418 | 468 |
| 20. | Patrick BERGER | Liverpool | 9 | 403 | 252 |

Home|Sign up|My Account|Table|Players|Clubs|Results|Rules|Schedule

FANTASY INTERNET SPORTS GAME

BACKGROUND OF THE INVENTION

I. Field of the Invention

The present invention relates to a fantasy sports league game in which participants act as "coaches" to form their own clubs or teams from among active league players and in which participant coaches are rewarded based upon the actual performance of the players on their teams in real life games as well as on the market value of their players.

II. Description of the Related Art

Fantasy sports league games are well known. Generally, in such games, participants select or "raft", currently active real-life athletes to form fantasy teams. A participant's success or failure in the game corresponds to the performance of the players in real-life games. Such games are often referred to as "rotisserie leagues". Owners of such fantasy teams compile won-lost records by competing head to head against each of the other teams in the league, the winner being determined by which team's players performed better the previous week.

Instantaneous communications technology allows people to participate in fantasy games in real time. For example, U.S. Pat. No. 5,018,736 to Pearson et al. describes an interactive contest that permits competition between remote participants. Participants register and can receive updates as to the progress of their teams by calling into a central location using the touch tone buttons on their telephones.

In the Pearson et al. patent, a team's performance is determined based upon the performance of the players on the participant's team roster in actual games. Comparison between teams is based upon team roster totals for given time periods. Team owners may make trades between the team roster and the contest roster. Throughout the duration of the contest, a voice interactive telephone menu is available to allow the participant to follow the progress of his or her team.

Some games have offered players the ability to participate in simulated gambling and stock market activities. For example, U.S. Pat. No. 6,007,427 to Wiener et al. describes a casino baseball game played on an electronic video gaming device. Player scores are determined based upon success in program-controlled "at bats". U.S. Pat. No. 5,713, 793 purports to combine elements of sports with that of the marketplace by providing a commodities options trading game in which the values of the simulated options are determined by a real-life sporting event. While using sports to define its market, this patent simply treats the sporting event as a commodity to be traded.

None of the patents discussed combine the fun of sports-based competition associated with a sports fantasy league with a test of the financial acumen necessary to maintain a team. Thus, the need exists for a game that combines the entertainment of fantasy sports with the excitement of participating in an economic venture.

SUMMARY OF THE INVENTION

In consideration of the above, the present invention is directed to a fantasy sports league game in which participants, acting as coaches and owners of fantasy teams made up of active players, can test their skill in player selection as well as in managing personnel and "virtual money" against other players. Thus, in the present invention the participant acts as both the coach and owner/general manager of his own team.

In accordance with one aspect of the present invention, there is provided a system for providing an interactive sports game to a plurality of participants each wishing to form a fantasy sports team made up of actual players, and each operating a participant terminal operable to act as a client on a network. The system comprises: a host controller, the host controller comprising a computer operable to act as a server on the network and to communicate with the participant terminals over the network; and data storage accessible to the host controller, the data storage storing information relating to performance of the players in actual games. The host controller is operable: (a) to solicit and accept from each participant an initial selection and purchase of players to form the participant's fantasy sports team, each participant purchasing the players using no more than a predetermined number of game value units initially allocated by the host controller, an initial value in game value units for each player being previously set by the host controller; and (b) responsive to a request of a participant, to access the data storage and report a status of the participant's fantasy team, the status including information as to performance and market, i.e., supply and demand, value of the players on the participant's team. The number of game value units associated with each player varies in correlation with demand of the participants for that player and a participant receives periodically a value-based reward correlated to the value of the players on his or her team. Preferably, a participant may invest any game value units unused in purchasing players in a fixed interest instrument or in a portfolio of stocks, the value of which tracks an existing stock market index.

In accordance with another aspect of the present invention, there is provided a method for providing an interactive sports game to a plurality of participants each wishing to form a fantasy sports team made up of actual players, and each operating a participant terminal operable to act as a client on a network, on a system comprising: a host controller, the host controller comprising a computer operable to act as a server on the network and to communicate with the participant terminals over the network; and data storage accessible to the host controller, the data storage storing information relating to performance of the players in actual games. The method comprising: (a) the host controller soliciting and accepting from each participant an initial selection and purchase of players to form the participant's fantasy sports team, each participant purchasing the players using no more than a predetermined number of game value units initially allocated by the host controller, an initial value in game value units for each player being previously set by the host controller; and (b) responsive to a request of a participant, accessing the data storage and reporting a status of the participant's fantasy team, the status including information as to performance and market value of the players on the participant's team. The number of game value units associated with each player varies in correlation with demand of the participants for that player and a participant receives periodically a value-based reward correlated to the value of the players on his or her team. Preferably, a participant may invest any game value units unused in purchasing players in a fixed interest instrument or in a portfolio of stocks, the value of which tracks an existing stock market index.

According to yet another aspect of the present invention, there is provided a computer-readable medium storing code for causing a processor-controlled system to perform a method for providing an interactive sports game to a plurality of participants each wishing to form a fantasy sports team made up of actual players, and each operating a participant terminal operable to act as a client on a network, the system comprising: a host controller, the host controller comprising a computer operable to act as a server on the network and to communicate with the participant terminals over the network; and data storage accessible to the host controller, the data storage storing information relating to performance of the players in actual games. The method comprises (a) the host controller soliciting and accepting from each participant an initial selection and purchase of players to form the participant's fantasy sports team, each participant purchasing the players using no more than a predetermined number of game value units initially allocated by the host controller, an initial value in game value units for each player being previously set by the host controller; and (b) responsive to a request of a participant, accessing the data storage and reporting a status of the participant's fantasy team, the status including information as to performance and market value of the players on the participant's team. The number of game value units associated with each player varies in correlation with demand of the participants for that player and a participant receives periodically a value-based reward correlated to the value of the players on his or her team. Preferably, a participant may invest any game value units unused in purchasing players in a fixed interest instrument or in a portfolio of stocks, the value of which tracks an existing stock market index.

According to still another aspect of the present invention, there is provided a method for a game participant, operating a client computer on a network, to play an interactive sports game run by an administrator operating a host computer on the network. The host computer: a) has access to a database of information relating to performance of players in actual games, and b) sets an initial value for each of the players based on predetermined criteria, the value for each player thereafter varying in accordance with demand for the player. The method comprising the steps of: purchasing players to form a team from among the players, the initial values of which have been set by the administrator, using no more than a predefined number of game value units allocated by the administrator for the purpose; and maintaining the team by selectively trading players, and by selectively investing or holding any game value units above the amount used to purchase players. The participant is eligible to win an award periodically on the basis of the value of his or her players, together with any additional game value units he or she may have accumulated.

BRIEF DESCRIPTION OF THE DRAWINGS

FIG. 2 illustrates an example home page in accordance with the present invention;

FIG. 4 illustrates an example page for player and team tactic selection in accordance with the present invention;

FIG. 5 illustrates the page shown in FIG. 4 after players have been selected;

FIG. 6 illustrates an example page on which a coach enters a pseudonym and password and selects insurance and investment options in accordance with the present invention;

FIG. 8 is an example of a page congratulating a newly-registered coach according to the present invention;

FIG. 10 is an example of a page showing a coach the progress of his or her fantasy sports team;

FIG. 12 is an example of a page showing a list of players eligible for selection by coaches in accordance with the present invention;

FIG. 13 is an example of page showing a list of real-life teams for a particular country's championship.

DETAILED DESCRIPTION OF THE PREFERRED EMBODIMENT

In the interactive sports league game of the present invention, a participant acts as a coach of his or her own clubs or teams (the terms club and team will be used interchangeably throughout). The team or teams selected by the coach compete against teams assembled by other game participants. The players on the team must be "purchased" by the coach using an opening budget of game value units, the equivalent of virtual money, assigned by the game administrator for this purpose. The game administrator also assigns the initial values for players, which value fluctuates in accordance with supply and demand (i.e., the supply and demand of the coaches) for the player. The allow the greatest number of participants, the game preferably is Internet based, with the game administrator operating a server or host computer site on the Internet, allowing participants to communicate with the server via browser software on their client home computers.

Figure 1A:
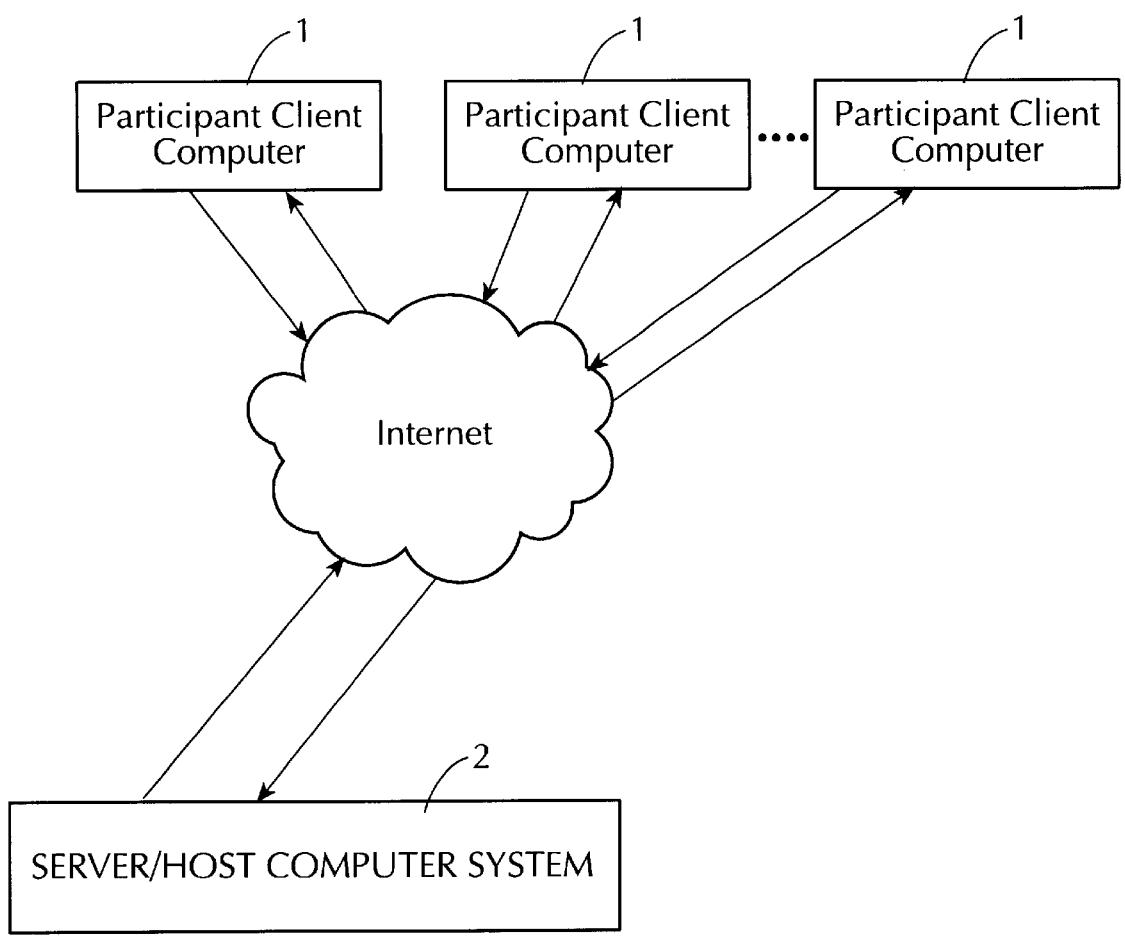
FIG. 1A is a block diagram showing an Internet-based hardware implementation of the fantasy sports game of the present invention.

An example of an Internet-based hardware implementation of the present invention is shown in FIG. 1A. As shown in the figure, game participants operating client computers 1 communicate with the Web server computer 2 of the game administrator, preferably by visiting and interacting with the Web site located on the server. This process is typically initiated by the participant typing, into his or her browser, the Uniform Resource Locator (URL) of the server Web site. In response to receipt of this communication from a participant's browser, software operating in the server computer 2 controls the server to send the browser the game's home page form, preferably a Hypertext Mark-up Language (HTML) document, having a menu of options to be discussed below. An interactive session ensues, which will be described in detail below with reference to a preferred embodiment, allowing the participant to register as a coach, select a team, and monitor the progress of his or her team, among other things.

The server computer 2 is programmed to format data, accessed from local or remote databases or other sources of data, for presentation to the participant, preferably in the format discussed in detail below. The server computer 2, although described herein in the singular, may actually comprise plural computers cooperating to perform the functions described herein.

The server computer programming can utilize any conventional Web data interface technique or techniques, such as Common Gateway Interface (CGI) protocol and associated applications (or "scripts"), or Java "servlets", i.e., Java applications running on the Web server. It will be appreciated that the interactive forms to be discussed below, which present forms for entry of information by the participants, and which save the entered information to a database, may be implemented in any of several conventional ways, using known server applications. For example, in response to entry of the participant's name and password, the server can redirect the information to a CGI application that is called when the participant clicks, for example, a "submit" icon. Access to databases, both local and remote, containing for example game information or information as to current sports results, also may be implemented, for example, by other CGI or similar applications.

An illustrative example of a fantasy sports game in accordance with the present invention will next be described as implemented in relation to a particular sport, namely European championship league soccer. However, as will be apparent to one skilled in the art, the game of the present invention is in no way limited to the illustrated embodiment or implementation and may be applied to any team sport, such as Baseball, American Football, Basketball, etc.

In the illustrated implementation based on the European soccer championships, a participant becomes a "coach" by filling in the registration form, to be discussed in detail below, and by forming his or her ideal team. Each game participant shall be referred to hereafter as a "coach".

Each coach may form one or two teams: a national team, by selecting players who are actually playing at the start of the season in one of five national soccer championships (France, England, Germany, Italy, Spain), and complying with the rules of that nationality; and an international team, by selecting players drawn randomly from these five championships.

The national team games are hereinafter referred to as "national championships", and the international team games as "international championships".

As will be described in further detail below, in a preferred embodiment of the soccer implementation, each team allows the coach at least two chances to win. The first consists of prizes offered periodically to the best teams based on a point ranking determined on the basis of the performance of the teams's players in actual games for the previous period. The second chance consists of money or prizes awarded at the end of the season to the best teams based on a value ranking for the team. The basis of the value ranking will be described below.

To form the team or teams, each coach must "buy" players. For that purpose, at the time his or her team is selected each player will be allocated units of account called Wams. For example, the units could be allocated as follows (the "opening capital"):

2200 Wams for the English championship
1700 Wams for the French championship
2100 Wams for the German championship
2200 Wams for the Italian championship
2000 Wams for the Spanish championship
2300 Wams for the international championship An initial Wam value is fixed by the organizer for each player at the beginning of the season. Preferably, to most closely correspond to the player's actual market value, some objective criteria, such as the actual salary of the player, is used or taken into account in setting the initial value.

This initial value preferably is adjusted automatically throughout the season by the host computer according to the supply and demand of participant coaches for each player. A preferred method of adjusting the value for any player is to add a predetermined value, such as one Wam, for each time a new coach picks the player or trades for him. If, on the other hand, a new coach does not pick a player, a much smaller value unit will be subtracted from the player's value. An preferred example of such smaller valued unit to be subtracted would be 1/(the number of teams in the championship). For example, if there are 40 teams in the real championship, 1/40 of a Wam would be subtracted from the player's value each time he is not chosen by a new coach.

The value of the team in Wams at any time shall consist of the sum of the individual values for each player, in addition to unused Wams. In selecting his or her team, the coach may not use more than the initial allocation of Wams. So that coaches can join the game at any time during the season and still have the same chance to win a prize, preferably the amount of Wam allocated for selecting the coach's players is increased throughout the season for new players.

Preferably, in the illustrated soccer embodiment, each team must be formed using one of the following six methods, as shown in Table I:

TABLE 1

|  | Goal | Defense | Midfield | Forwards |
|---|---|---|---|---|
| Method 1: | 1 | 5 | 3 | 2 |
| Method 2: | 1 | 4 | 4 | 2 |
| Method 3: | 1 | 4 | 3 | 3 |
| Method 4: | 1 | 4 | 2 | 4 |
| Method 5: | 1 | 3 | 4 | 3 |
| Method 6: | 1 | 3 | 5 | 2 |

The players are selected from a list proposed for each championship by the organizer and play in the positions they actually play in their own clubs.

If the coach selects a national team, he may select at random players with the nationality of any one of the countries whose clubs take part in the national championship of the country in question and belong to UEFA (Union of European Football Associations). Preferably, the coach may select only up to three players with the nationality of the country whose clubs take part in the national championship of the country in question and do not belong to UEFA.

Alternatively, the coach may choose to have his or her team or teams picked automatically by the game software on a random basis. If that option is chosen, preferably, the whole of the coach's Wam capital will be used up in this automatic selection.

For the duration of the season, which shall preferably be based on the actual soccer championship season calender, the coaches may transfer players by paying or receiving for each player bought or sold his value in Wams on the day of transfer. Preferably, this transfer may not include more than three players per team each week, the week being for this purpose preferably defined as the period between Monday evening at 6 o'clock GMT and the following Monday evening at 6 o'clock GMT.

At the time of each transfer a commission (determined in Wams), preferably of 10% of the sale price of the player, is deducted from the coach's amount of Wams. If he or she wishes, the coach may also take out insurance for one or more players on the team in order to cover the possibility that the player is injured and cannot play in more than two consecutive matches played by his/their club. For this purpose, the coach must pay a premium, preferably 10% of the value of the team on the date of taking the insurance for every team he or she wishes to insure. This insurance allows the coach to sell the player or players concerned at the Wan value at which he bought them, or if greater, at the player or players' value in Wams on the day before he/they were injured. The insurance may be used for a maximum of three players per team during any one season.

Throughout the season, the opening capital preferably shall be gradually: (a) reduced by the coach's expenses, that is to say the number of Wams corresponding to the value, at the date of the purchase, of the players purchased by him or her, either originally or at the time of a transfer, as well as transfer commissions and any insurance premiums; and (b) increased by coach income, that is to say the number of Wams corresponding to the value, at the date of sale, of players transferred at the time of transfer.

The coach may at no time spend more than the available balance of his or her Wam capital. The coach may decide to invest his or her available balance, either at a fixed rate of 4%, or in a virtual basket of shares that tracks the Eurostoxx 50 index.

As was discussed previously, each coach has at least two chances to win per team. Each of the coach's teams takes part in at least two competitions allowing him or her to gain a prize item each month and a large cash prize at the end of the season, the monthly prizes preferably being based on a point ranking and the large end-of-season prizes preferably being based on a value ranking, according to the terms described below. Optionally, a third prize may be offered using a combination of points and value ranking. For example, a points per value unit ranking could be the basis of a third prize.

At monthly, or other conveniently periodic, intervals, winners will be determined based on a point system. Each week each coach's national and/or international team scores points according to the actual performance of the players in real life soccer games. A certain number of points is defined according to the scale discussed below, and is awarded to each player on the team according to his actual performance during the week in the club to which he belongs, and the actual performance of his club. Only the performance of players and the club in matches of the actual national championship to which the club belongs is taken into consideration in point determination. The sum of points accumulated by each player on the coach's team or teams will give the number of points awarded to each team each week. An example of a preferred point system follows.

The scale of points:

a) Points won or lost according to the results of the players' club:

Win 30,

Loss 0,

Draw 10,

Goals scored against the club if the club wins or draws:

For each goal scored by a forward or midfielder: −2

For each goal scored by a defender: −3

Goals scored by the club if the club loses:

For each goal scored by a defender: −5

For each goal scored by another player: −3

A match without goals:

If a defender: 3 points b) Points won or lost according to the actual participation of the player in the match:

For a whole match: 3

For part of a match: 2

Each time a player is brought on as a substitute: 1

Each time a player does not play in a match in which his club plays: −10 c) Points added or deducted according to the player's individual performance: Cards:

For each yellow card: −5

For each red card: −10

For each goal scored:

If a forward: 10

If a midfield: 15

If a defender or goal-keeper: 20

Deciding goal in the last 15 minutes: 10 (in addition to other points).

Due to the differences in championship calendars in European countries, some players may not play in a match during a week or may play two matches. The method of calculating points takes this factor into consideration as follows.

For the international team the number of points scored by the players on a coach's team is equal to a number of points scored by players on that team divided by the number of players on the team who belong to a club that actually played in a match in its international championship during the week in question. Where the same club plays in more than one match per week, the following will be added to the number of players: the number of matches over 1 in which the club played and the number of that club's players over 1, who belong to the coach's team.

Example: If during any week in the month of January a coach's international team includes a player who belongs to a club taking part in a German championship and the club has not played any matches in this championship, the number of points scored during the week in question shall be divided by 10.

If on the contrary the international team includes a Frenchman belonging to a club playing two matches in the week and the end results are fixed for example on 7 February, the number of points scored during the week in question shall be divided by 12; if two Frenchmen belonging to this club are part of the coach's international team, the number of points shall be divided by 13.

In the case of a national team, the number of points scored by a team equals the number of points scored by the team's players divided by 11.

Weekly points preferably shall be determined at a predetermined time and day of the week. At the end of the month the total of points accumulated during the weeks of that month will be calculated. It will then be decided for each national championship and for the international championship which ten teams have won the most points during the month in question. The coaches of those teams will win a prize. The list of these prizes preferably are published at the beginning of the following month on the main game home page screen.

If so many teams have an equal point total that the number of winners per championship would be more than ten, the ten winners may preferably be determined by declaring as winner the coach who spends the least Wams to make up his team; if there is another tie, then the winner is the coach who made the least number of transfers and, finally, if there is yet another tie, the winner is the coach with the team whose players have the lowest average age, using the day, month and year of birth to calculate that figure.

Winners at the end of the season are preferably determined based on value-ranking. At the end of the season a super prize will be offered in each of the six championships to the coach whose team has made the most progress in Wams (sum of the value in Wams for each player on the team). The comparison will be made between all the teams taking part in the same championship. The value ranking is totally independent of the point ranking discussed in the previous section. It should be noted that a player's value, after its initial setting by the game administrator, is determined on supply and demand of coaches, and is not affected by points earned by the player. Such market value will not strictly correlate with performance since other factors are involved in a player's popularity with coaches. For example, some players remain popular, and are thus desired by coaches, even though they are past their playing prime. Other players may be in demand based on their looks, or the fact that they have endorsements.

Where two or more teams are tied in terms of value ranking, the winner preferably will be the coach who at the start spent the least in Wams to make up his team; if there is another tie between one or more coaches, the winner will be the one who made the least number of transfers, and finally, if there is again a tie, the winner will be the coach with the team whose players have the lowest average age, using the day, month and year of birth to calculate that figure. The total sum that will be distributed by way of prizes between winners of the value ranking will be equal to one euro per coach taking part in the game (thus the more coaches there are who play, the greater the total sum will be). To determine this, each coach who fully and correctly filled out, validated and emailed in his registration form will be counted. This total sum preferably shall be shared among the winners in each of the six championships as follows:

- xxx—the sum total allotted to the winners of the international championship shall be twice that allotted to each of the five national championships, each of which shall receive exactly the same amount.
  Within each championship, the total sum allotted will be divided as follows:
  3 shares to the coach with the highest Wam value;
  2 shares to the coach with the second highest Wam value; and
  1 share to the coach with the third highest Wam value.
  For example:
- If the Game has ten thousand coaches, the sum total to distribute is 10,000 euro. The first in each national championship shall win 714 euro, the second 476 euro and the third 238 euro. The first in the international championship shall win 1,430 euro, the second 950 euro and the third 480 euro.
- If the Game has a hundred thousand coaches, the sum total to distribute is 100,000 euro. The first in each national championship shall win 7,140 euro, the second 4,760 euro and the third 2,380 euro. The first in the international championship shall win 14,300 euro, the second 9,500 euro and the third 4,800 euro.
- If the Game has a million coaches, the sum total to distribute is 1,000,000 euro. The first in each national championship shall win 71,400 euro, the second 47,600 euro and the third 23,800 euro. The first in the international championship shall win 143,000 euro, the second 95,000 euro and the third 48,000 euro.

At any time, coaches may consult their team's position by obtaining the point value classification for each player, his Wam value and the change in percentage since he was purchased, the total value of the team in Wam and its change since the team was formed as well as the number of transfers made, in the manner discussed in detail below.

The coach may also obtain the value of the highest-ranked team, the average value for each of the teams as well as the points for each player and those won by the best team (as determined each week).

The registration process will now be described in accordance of a preferred embodiment of the soccer implementation. Of course, the invention is not limited to the preferred embodiment.

Figure 1B:
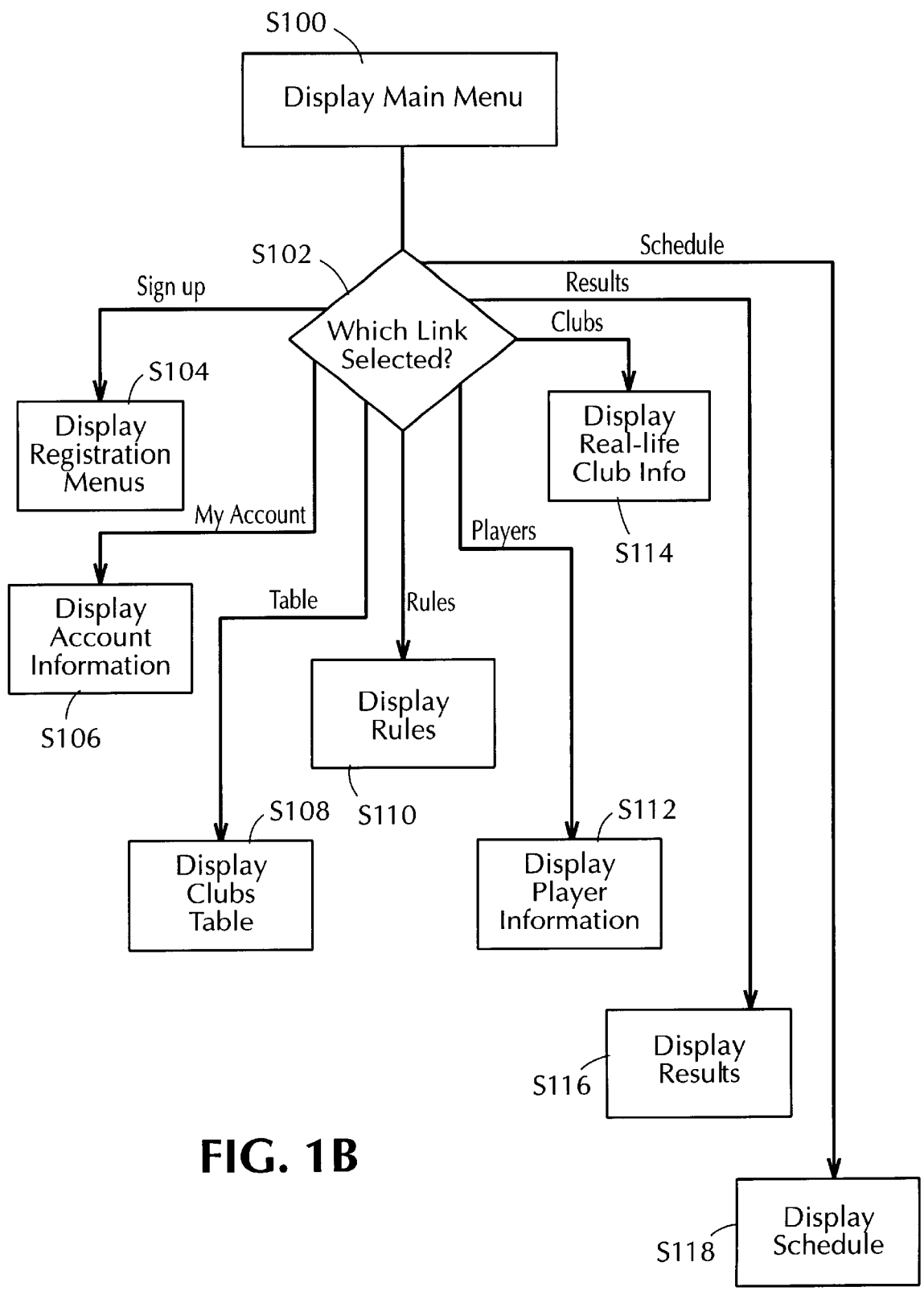
FIG. 1B is a flow diagram illustrating the flow of operation from the main menu of the present invention depending upon which of several links is selected.

When a participant uses his or her browser to visit the Web site of the game organizer, a game home page appears. The home page offers the participant several options, implemented preferably as hypertext links, as to how to proceed. The options are shown in the flowchart of FIG. 1B.

As shown in that figure, in response to the participant visiting the game web site, by for example entering the web site's URL into his or her browser, a home page of the game Web site is presented to the participant. The home page of the game Web site presents a visiting participant, or potential participant, with a menu of several links, at step S100. An example of a home page in accordance with a preferred embodiment of the present invention is shown in FIG. 2. Depending upon which link is selected, a host computer program decides, at step S102, which screens, preferably HTML pages or the like, to display to the participant next.

If the participant clicks the "sign up" link, flow proceeds to step S104, at which Web server software running on the host computer of the game Web site causes HTML pages such as those shown in FIGS. 3–8 to be transmitted, in the order and manner discussed in detail below with reference to those figures, to the participant's browser. If the participant clicks the "my account" link, flow proceeds to step S106, at which software running on the server computer causes the screens shown in FIGS. 9 and 10 to be transmitted, in the order and manner discussed in detail below with reference to those figures, to the participant's browser.

Figure 11:
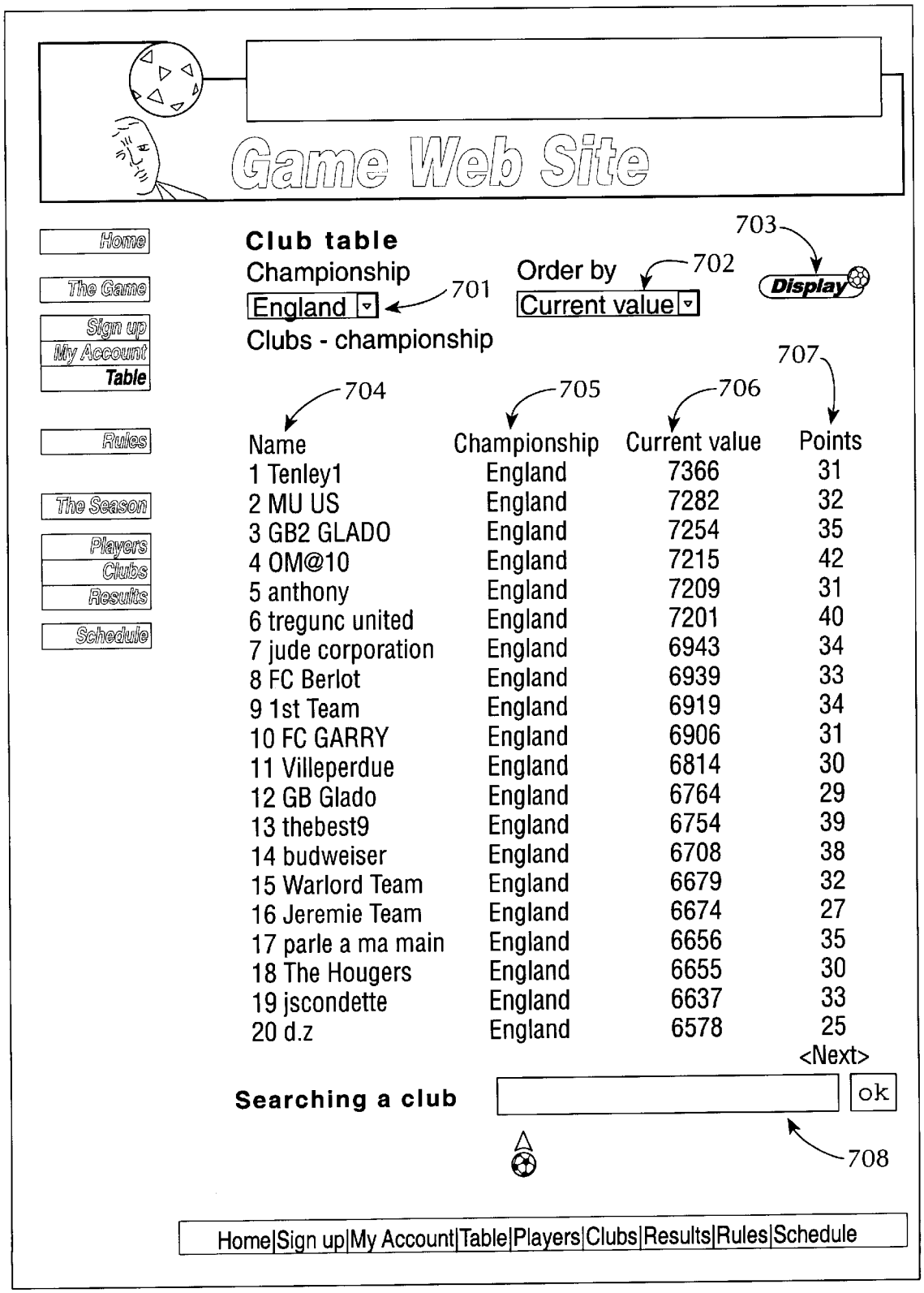
FIG. 11 is an example of a page showing a list of all coaches clubs registered to play the game of the present invention.

If the link "Table" is selected, flow proceeds to step S108, at which point the Web server will transmit an HTML page having a list of already registered fantasy clubs to be displayed, for example in the format shown in FIG. 11, to be discussed in detail below.

If the link "Rules" is selected, the Web server will transmit, at step S110, an HTML page having a copy of the rules of the game in accordance with the present invention.

If the link "Players" is selected, the Web server will transmit, at step S112, and HTML page having a listing of information about players eligible for selection in the fantasy sports game. An example of a screen showing such a listing is shown in FIG. 12, which will be discussed in detail below.

If the link "Clubs" is selected, the Web server will transmit, at step S114, an HTML page with information relating to actual real-life soccer clubs on which the players eligible for selection in the game play. An example of a screen showing such information is shown in FIG. 13, which will be discussed in detail below.

Figure 14A:
FIG. 14, which consists of FIGS. 14A and 14B, is an example page showing results in a real-life sporting league for a particular day.

If the link "Results" is selected, the Web server will transmit, at step S116, an HTML page having results of matches in real-life games of actual clubs. An example of a screen showing such information is shown in FIG. 14, which will be discussed in detail below.

If the link "Schedule" is selected, the Web server transmit, at step S118, an HTML page (not shown) listing the schedule for the current season of the real life teams in the championship.

The individual screens, caused by transmission of the respective Web pages, presented to the participant to implement the functions shown in the flowchart will now be discussed individually.

A visitor to the site wishing to register as a new coach must first select, on the home page, the link "sign up".

Figure 3:
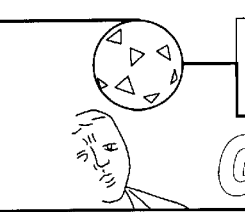
FIG. 3 illustrate an example sign up page in accordance with the present invention.

Clicking on this link causes the server to send to the visitor's browser a page consisting of a sign up form. An example of such a sign up form is shown in FIG. 3. As can be seen from the figure, the form informs the participant of the option to form one or two teams. Radio buttons 100 are provided for selecting the national team, each button having a country flag associated therewith. The participant may select one of these buttons by clicking it with a mouse or other similar cursor movement and selection device. Radio buttons 102 are provided to allow the participant to indicate whether he or she wishes additionally to form an international team.

Entry area 104 is provided for the participant to enter a club name. To increase the enjoyment of the game, the coach also is encouraged to create a team shirt by selecting colors from radio buttons 106. As the buttons are selected, in response to clicking of "Display" button 107, shirt icon 108 changes colors in real time to show the coach what his or her team shirt will look like.

Once the coach is satisfied with the selected name and other entered information, he or she clicks the submit icon 110 which registers the information with the organizer's server computer.

In response to receipt of the team information entered in the form of FIG. 3, the server presents the coach with another form (HTML document) requesting formation of the national team. An example of such a form is shown in FIG. 4. As shown in the figure, the coach is informed at the top of the form that he or she has initial capital of 3200 Wam and can spend up to 2900 Wam to buy players. The coach also has the option to have the game administrator select the team automatically, in which case the coach clicks automatic selection button 200 and all 2900 Wam will be used up and the players will be selected at random.

The default team tactic (i.e., method of grouping of position players, as in Table I above) is shown in the figure in team tactic selection tool 202. This tool also functions as a drop down menu to allow the coach modify the default setting to select any one of the methods shown in Table I above to form the team. Depending on the tactic selected, the appropriate number of players from each position may be selected. If manual player selection is chosen, the coach clicks at the hypertext link under each position and is presented with a list of all players at that position in the selected national championship. For example, the list of goalkeepers is listed at the bottom of the FIG. 4. Similar lists are presented as the coach selects the link for each position to fill his or her team.

As the players are selected in the manual mode, the team value tally 208 is incremented. The coach may not exceed the upper limit, in the example 2900, when selecting his or her team players. FIG. 5 shows the screen presented to the coach after the team has been selected. Note that even when automatic selection has been effected, the coach can modify any player selection by clicking on the modify link associated with the player, as long as the spending constraints are not exceeded.

Once the team has been selected, the coach is presented with a form requesting that he or she select a manager surname, or pseudonym, and a password. This manager name and password will be requested by the server whenever the coach wishes to check on the progress of his or her team after the registration process is complete. The coach also is asked at this time whether he or she wishes to purchase insurance, in case one or more of the coach's players becomes injured and cannot play in subsequent matches. The insurance option can be selected by clicking the appropriate one of radio buttons 304. As mentioned above, the premium for the insurance is ten percent of the current value of the team. The coach is also presented, by means of radio buttons 305, with the option of investing his or her available balance of capital in a portfolio of stocks, tracking the Eurostoxx 50, at a fixed rate bond, in the example, at 4%, or to have no investment.

Figure 7:
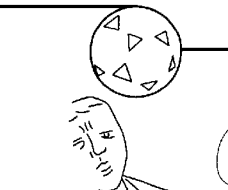
FIG. 7 illustrates an example of a personal data entry page in accordance with the present invention.

Note that in the illustrated example, the coach has not selected an international team. Had such a team been selected, the same information and options would have been presented in a second column in FIG. 6. FIG. 7 shows an example of a form that may be downloaded to the coach's browser to request entry of personal information about the coach. If the coach wishes to be eligible for prizes, he or she must enter valid personal data. Participants who enter false data can still keep track of the progress of their team, but will not be eligible for prizes.

Upon successful registration, the coach is presented with a form such as that shown in FIG. 8, encouraging the coach to enjoy playing the game.

Figure 9:
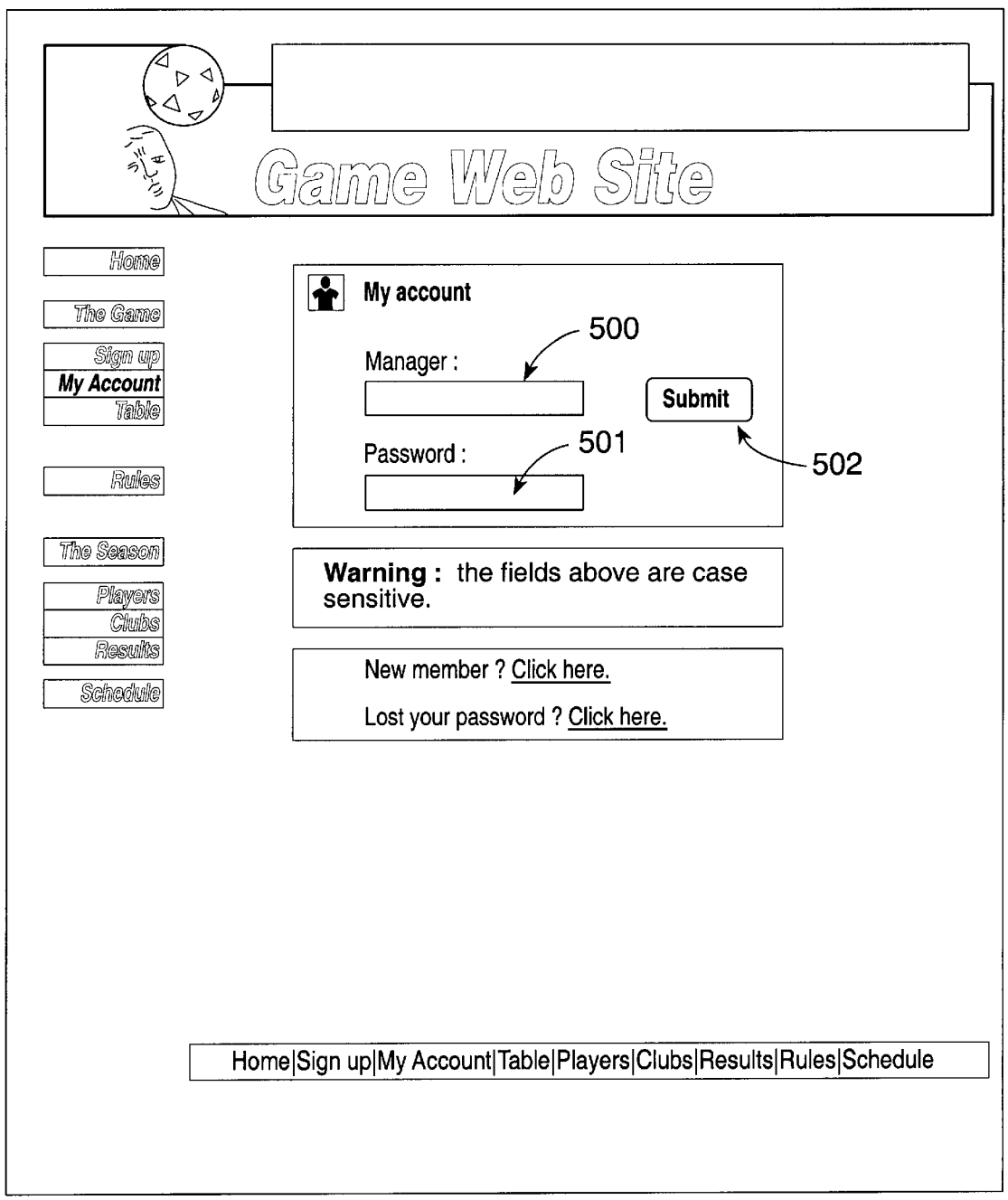
FIG. 9 is an example page requesting that a participating coach enter his or her name and password.

After a participant has registered as a coach, he or she, on subsequent visits to the organizer's Web site, can check on the progress of his or her team. As shown in FIG. 2, a registered coach, instead of selecting "sign up" can select "my account". The coach selects this as a hyperlink on the game home page, and in response the server presents the coach with a form such as the one shown in FIG. 9. In FIG. 9, the coach is presented with manager name entry space 500 and password entry space 501. Once this information has been entered, it is sent to the server by the coach clicking the submit button 502.

In response to the coach's entry of the manager name and password, the server transmits to the coach's computer a form indicating the coach's team's progress. An example of such a form is shown in FIG. 10. As shown in the figure, in addition to identifying information as to the coach's team, FIG. 10 presents the coach with four basic information fields, which are described as follows.

Team data field 600 consists of: player column 601, which is a list of the players currently on the coach's team and their position; purchased value column 602, which lists the value at which the players were purchased; current value column 603, which lists each player's current value, as determined by the market for the player among the coaches playing the game; progress column 604, which lists the percentage of change, if any, of value of each player; points column 605, which lists the points accumulated by each player in accordance with the point scoring formula outlined above; date of purchase column 606 indicates the date the player was purchased; and transfer link column 607, presents the coach with links allowing him or her to initiate a transfer of any player in accordance with the rules set forth above.

Value data field 610 lists the current team value in Wams, the purchased value, the placement and the total value. Also displayed is the progress in percent. Value ranking field 621 displays which position, among all participant coaches, is occupied by the coach in terms of team value. The points ranking field displays the coach's current point position in relation to all other coaches.

Another link available for selection on the main menu is labelled "Table". The clicking of this link transmits to the coach's browser a menu listing the fantasy clubs participating in the game. An example of such a menu is shown in FIG. 11. As shown in the figure, the exact information to be displayed can be determined by use of drop down menus 701 and 702. Drop down menu 701 allows the coach to see a list of clubs in any of the country championships as well as the international championship. Drop down menu 702 allows the list to be sorted either by value or by points. In the example shown in the figure, the list is of clubs in the England championship sorted by current value. A search window 708 is provided to allow the coach to search for a particular club.

The main menu shown in FIG. 2 also provides a link entitled Rules. Clicking this link causes a document comprising the rules of the game to be transmitted to the coach's browser. Clicking the link "Players" causes a list of all athletes eligible to be on any team in the fantasy league to be transmitted to the coach's browser for display. An example of such a list is shown in FIG. 12. In that figure, all players are made available for viewing, although on any one screen only a certain number of players will fit. Thus, links are made available to view succeeding portions of the list, using techniques well known in the art, such as next buttons or the like.

Drop down menu 800 allows the coach to determine the players from which championship will be displayed. The coach can choose from among the international championship and the country championships mentioned above. Drop down menu 801 allows the player to limit which positions are displayed. In the example, "all" has been selected, so all players from the England championship will be displayed. Other options include showing only goalkeepers, defenders, midfielders or strikers. Drop down menu 802 allows the list to be sorted on the basis of alphabetical order, current value, progression, points, and demand, respectively. Player information is preferably set forth in columns such as columns 805, 806, 807, 808, 809, 810, 811, 812, and 813, corresponding to the player's name, club, position, current value, highest value, lowest value, progression, points and demand, respectively. To search for a specific player, the coach can enter the player's name in search window 814 and click "OK".

The main menu also provides a link for the coach to view a list of clubs. Clicking on the link will cause the server to direct the coach's browser to a menu displaying a list of actual real-life soccer clubs in the country championships listed above. An example of such a menu is shown in FIG. 13. As shown in the figure, drop down menu 900 allows the coach to select which country's clubs will be listed. Drop down menu 901 allows the teams to be sorted by alphabetic order, average value or by total value. Columns 902, 903 and 904 display the club name, average value for each club and total value for each club, respectively.

Another link provided on the main menu is "results". When the coach clicks on this link, he or she is directed to a page listing results of that day's actual games of the real life teams in a particular championship. FIG. 14 is an example of such a page. In the figure, drop down menu 1001 allows the coach to select for which championship he or she wishes to see results. Drop down menu 1002 allows the coach to choose for which day he or she wishes to see results. Below those menus, in area 1003, results for the selected day are displayed. In area 1004, the real-life teams are listed in points order. In area 1005, the top scoring players in the selected championship are listed, with associated information, such as their teams, goals, value and demand.

The above-described embodiment allows coaches to follow the progress of their team or teams, both from the viewpoint of athletic performance, which is reflected by points, as well as the value of the investment of fantasy money used to form the team. In view of this combination of activities, a coach can experience the feeling not only of coaching a team, but of being a team owner and general manager. This is further heightened by the participant coach's ability to trade players, purchase insurance and invest surplus funds.

As would be apparent to one skilled in the art, the above-described fantasy game can just as easily be applied to sports other than soccer. For example, baseball players, even more so than soccer players, have associated performance-based statistical data. All of the information windows discussed above could be used to show baseball players, their teams, their values and points derived from performance characteristics, such as batting average, number of runs batted in or home runs. Pitchers can easily be evaluated in terms of wins, earned run average, strikeouts, walks (control) and other statistical criteria. So, in a baseball implementation, a coach would select position players as well as pitchers, and preferably several bench players. In such implementation, points-based prizes can be based upon the performance of the baseball players' performance for the preceding week, for example. At the end of the season, the collective value of the players on the coach's roster, taking into account market fluctuations in player value and investment, just as in the soccer implementation, can be used to award a grand prize.

Further, the present invention can easily be implemented using other league sports such as Ice Hockey or American Football, as will be appreciated by those skilled in the art.

What is claimed is:

1. A system for providing an interactive sports game to a plurality of participants each wishing to form a fantasy sports team made up of actual players, and each operating a participant terminal operable to act as a client on a network, the system comprising:

a host controller, the host controller comprising a computer operable to act as a server on the network and to communicate with the participant terminals over the network; and data storage accessible to the host controller, the data storage storing information relating to performance of the players in actual games, the host controller being operable:

(a) to solicit and accept from each participant an initial selection and purchase of players to form the participant's fantasy sports team, each participant purchasing the players using no more than a predetermined number of game value units initially allocated by the host controller, an initial value in game value units for each player being previously set by the host controller; and (b) responsive to a request of a participant, to access the data storage and report a status of the participant's fantasy team, the status including information as to performance and market value of the players on the participant's team, wherein the number of game value units associated with each player varies in correlation with demand of the participants for that player and a participant receives periodically a value-based reward correlated to the value of the players on his or her team, wherein a participant may invest any game values units unused in purchasing players in a fixed interest instrument or in a portfolio of stocks, the value of which tracks an existing stock market index.

2. A system according to claim 1, wherein the server is operable to reward participants periodically on the basis of points related to actual performance of the participant team's players in real games, and the value-based reward is awarded at season end to the participant having the most game value units, taking into account the current value of the players on his or her team as well as the number of the unused game value units.

3. A system according to claim 2, wherein the host controller is operable to accept instructions from the participant to trade a player on the participant's team for a different player.

4. A system according to claim 1, wherein the host controller is operable to offer player insurance to any participant to allow the participant to trade an injured player for the amount of game value units initially paid for the injured player.

5. A system according to claim 1, wherein the game is soccer and the host controller is operable to accept from each participant a designation of team tactic relating to how many players from each position make up the fantasy team.

6. A method for providing an interactive sports game to a plurality of participants each wishing to form a fantasy sports team made up of actual players, and each operating a participant terminal operable to act as a client on a network, on a system comprising: a host controller, the host controller comprising a computer operable to act as a server on the network and to communicate with the participant terminals over the network; and data storage accessible to the host controller, the data storage storing information relating to performance of the players in actual games, the method comprising:

(a) the host controller soliciting and accepting from each participant an initial selection and purchase of players to form the participant's fantasy sports team, each participant purchasing the players using no more than a predetermined number of game value units initially allocated by the host controller, an initial value in game value units for each player being previously set by the host controller; and (b) responsive to a request of a participant, accessing the data storage and reporting a status of the participant's fantasy team, the status including information as to performance and market value of the players on the participant's team, wherein the number of game value units associated with each player varies in correlation with demand of the participants for that player and a participant receives periodically a value-based reward correlated to the value of the players on his or her team, wherein a participant may invest any game values units unused in purchasing players in a fixed interest instrument or in a portfolio of stocks, the value of which tracks an existing stock market index.

7. A method according to claim 6, further comprising rewarding participants periodically on the basis of points related to actual performance of the participant team's players in real games, and the value-based reward is awarded at season end to the participant having the most game value units, taking into account the current value of the players on his or her team as well as the number of the unused game value units.

8. A method according to claim 7, further comprising accepting instructions from the participant to trade a player on the participant's team for a different player.

9. A method according to claim 6, further comprising offering player insurance to any participant to allow the participant to trade an injured player for the amount of game value units initially paid for the injured player.

10. A method according to claim 6, wherein the game is soccer and the method further comprises accepting from each participant a designation of team tactic relating to how many players from each position make up the fantasy team.

11. A computer-readable medium storing code for causing a processor-controlled system to perform a method for providing an interactive sports game to a plurality of participants each wishing to form a fantasy sports team made up of actual players, and each operating a participant terminal operable to act as a client on a network, the system comprising: a host controller, the host controller comprising a computer operable to act as a server on the network and to communicate with the participant terminals over the network; and data storage accessible to the host controller, the data storage storing information relating to performance of the players in actual games, the method comprising:

(a) the host controller soliciting and accepting from each participant an initial selection and purchase of players to form the participant's fantasy sports team, each participant purchasing the players using no more than a predetermined number of game value units initially allocated by the host controller, an initial value in game value units for each player being previously set by the host controller; and (b) responsive to a request of a participant, accessing the data storage and reporting a status of the participant's fantasy team, the status including information as to performance and market value of the players on the participant's team, wherein the number of game value units associated with each player varies in correlation with demand of the participants for that player and a participant receives periodically a value-based reward correlated to the value of the players on his or her team, wherein a participant may invest any game values units unused in purchasing players in a fixed interest instrument or in a portfolio of stocks, the value of which tracks an existing stock market index.

12. A computer-readable medium according to claim 11, the method further comprising rewarding participants periodically on the basis of points related to actual performance of the participant team's players in real games, and the value-based reward is awarded at season end to the participant having the most game value units, taking into account the current value of the players on his or her team as well as the number of the unused game value units.

13. A computer-readable medium according to claim 12, the method further comprising accepting instructions from the participant to trade a player on the participant's team for a different player.

14. A computer-readable medium according to claim 11, the method further comprising offering player insurance to any participant to allow the participant to trade an injured player for the amount of game value units initially paid for the injured player.

15. A computer-readable medium according to claim 11, wherein the game is soccer and the method further comprises accepting from each participant a designation of team tactic relating to how many players from each position make up the fantasy team.

16. A method for a game participant, operating a client computer on a network, to play an interactive sports game run by an administrator operating a host computer on the network, the host computer: a) having access to a database of information relating to performance of players in actual games, and b) setting an initial value for each of the players based on predetermined criteria, the value for each player thereafter varying in accordance with demand for the player, the method comprising the steps of:

purchasing players to form a team from among the players, the initial values of which have been set by the administrator, using no more than a predefined number of game value units allocated by the administrator for the purpose; and maintaining the team by selectively trading players, and by selectively investing or holding any game value units above the amount used to purchase players, wherein the participant is eligible to win an award periodically on the basis of the value of his or her players, together with any additional game value units he or she may have accumulated, wherein a participant may invest any game values units unused in purchasing players in a fixed interest instrument or in a portfolio of stocks, the value of which tracks an existing stock market index.

17. A method according to claim 16, wherein during the course of a season, the players accumulate points based upon their performance in actual games and the participant is eligible periodically to win an award on the basis of accumulated points of the players on his or her team.

18. A method according to claim 16, wherein the variation from the initial value for each player is based upon whether the player is selected by the participant.

19. A method according to claim 18, wherein the participant is one of many participants in the game, and the value for each player varies from the initial value on the basis of the player being selected by the participants forming their teams or through trades.

20. A method according to claim 19, wherein a player's value increases by a first predetermined amount when he is selected by a participant and decreases by a second predetermined amount, less than the first predetermined amount, when the player is not chosen by a participant.

* * * * *